No. 772,333. PATENTED OCT. 18, 1904.
L. BIERSACH.
FISH HOOK.
APPLICATION FILED FEB. 12, 1904.
NO MODEL.
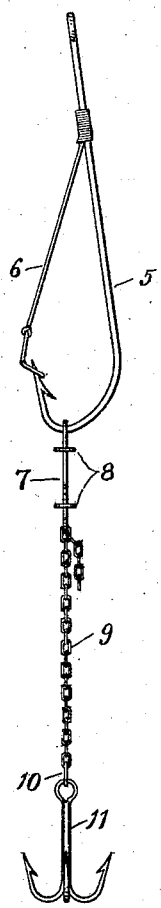
Fig. 1.
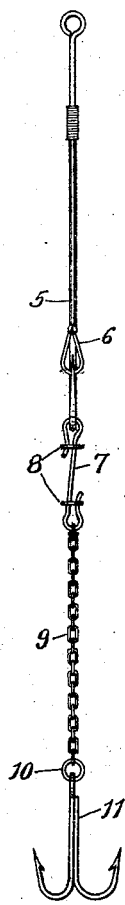
Fig. 2.
Fig. 3.
Witnesses.
Inventor.
Louis Biersach
By Benedict & Morsell
Attorneys.

No. 772,333. Patented October 18, 1904.

UNITED STATES PATENT OFFICE.

LOUIS BIERSACH, OF FREEPORT, ILLINOIS.

FISH-HOOK.

SPECIFICATION forming part of Letters Patent No. 772,333, dated October 18, 1904.

Application filed February 12, 1904. Serial No. 193,236. (No model.)

*To all whom it may concern:*

Be it known that I, LOUIS BIERSACH, residing at Freeport, in the county of Stephenson and State of Illinois, have invented a new and useful Improvement in Fish-Hooks, of which the following is a description, reference being had to the accompanying drawings, which are a part of this specification.

This invention relates to certain new and useful improvements in fish-hooks, and has for its object to provide a hook capable of carrying a live bait with means for engaging said bait at a distance from the hook proper, said means being adjustable with relation to the hook proper in order to accommodate bait of different sizes.

With the above and other objects in view the invention consists in the devices and parts and their equivalents, as hereinafter set forth.

Referring to the accompanying drawings, in which like characters of reference indicate the same parts in the several views, Figure 1 is an elevation of a fish-hook embodying my invention. Fig. 2 is a similar view thereof, taken at right angles to Fig. 1; and Fig. 3 is a plan view of the connector.

In the drawings, 5 represents the hook proper, which may be of any size or shape and as here shown is of the weedless type, having the looped guard-wire 6, as usual.

A connector 7 is formed of a piece of spring-wire bent back at its ends to form oppositely-extending hook-eyes, the free ends being bent outwardly to serve as retainers for the rings 8, which surround the connector 7. The rings 8 are adapted to be engaged by such hook ends when said ends are sprung toward the main portion of the connector and then released, their tendency to spring outwardly serving to secure the rings 8 in the curved end portions thereof and so close the hook-eyes. The upper hook-eye of the connector is engaged by the hook 5 and is prevented from disengagement therewith by said hook-eye being closed by its ring 8, as just described. The closed hook-eye is also prevented from removal from the hook 5 by reason of the projecting barb of said hook. The lower hook-eye of the connector 7 is adapted to hook in any of the links of a chain 9 and be similarly locked thereto by its ring 8, and at the lower end of said chain is secured by a ring 10 a treble hook of ordinary construction.

In operation the bait, usually a live frog, is secured to the main hook 5 by having said hook passed through its mouth, and the treble hook 11 is then engaged with the frog's legs, the chain 9 having been adjusted so that the distance between the main hook 5 and the treble hook 11 is such that the frog may assume its natural positions, so that as it is drawn through the water it may make its natural motions and so attract the fish. The chain 9 serves as a weight to keep the frog right side up while it is being drawn through the water and is quickly and easily adjusted to vary the distance between the hooks by disengaging it from the connector 7 and engaging a new link therewith.

It is obvious that with a bait having hooks at both ends, as with my invention, there is no possibility of a fish getting away with part of the bait, for when the bait is taken at either end the main hook or the rear hook is sure to engage, and the rear hook being connected with the front or main hook by means of the chain connection there is no more liability of the fish getting away when caught by the rear hook than by the front hook, especially as said rear hook is of the treble form. If the fish attempts to take the entire bait, both front and rear hooks will be engaged; but in most cases it will be found that the rear hook alone is taken.

The invention is not limited to any particular form or shape of hook in either the front or the rear; but those shown are preferred.

It is apparent that the connector 7, with its chain and rear hook, may constitute an attachment to be connected to any hook or lure in use, and, furthermore, any other form of connector might be employed, or the chain-links may possibly engage with the front hook direct without departing from the invention.

What I claim as my invention is—

1. In a fish-hook, a front hook and a rear hook, and adjustable means connecting the two hooks, said means being non-extensible in its adjustments.

2. In a fish-hook, a front hook and a rear hook, and a chain connecting the two hooks and adapted to permit of the non-extensible adjustment of said hooks in relation to each other.

3. In a fish-hook, a main hook, a connector engaging the main hook, a chain adjustably and non-extensibly engaged by the connector, and a rear hook carried by the chain.

4. In a fish-hook, a main hook, a connector having its ends bent to form hook-eyes, one of said hook-eyes engaging the main hook, a chain adjustably connected to the connector by having one of its links engaging the other hook-eye thereof, rings slidable on the connector to close the hook-eyes, and a rear hook carried by the chain.

5. In a fish-hook, a pair of hooks, a connector therefor comprising a wire bent at its ends to form hook-eyes with outwardly-turned extremities, rings slidable on said connector and adapted to close the hook-eyes thereof by having said extremities sprung into said rings, one of said hook-eyes having engagement with one hook, and a chain connected with the other hook and having adjustable connection with the other of said hook-eyes.

6. In a fish-hook, a main hook, a connector comprising a piece of wire bent at its ends to form hook-eyes, one of said hook-eyes engaging with the main hook, rings on the connector to close the hook-eyes by having the extremities of said connector sprung therein, a chain engaged by the other hook-eye of the connector, and a treble hook carried by the chain, said treble hook being adjustable to and from the main hook by engaging different links of the chain with the connector to enable said treble hook to be engaged with the rear portion of a bait while the front portion of said bait is engaged by the main hook, the weight of the chain and connector serving to keep the bait upright.

In testimony whereof I affix my signature in presence of two witnesses.

LOUIS BIERSACH.

Witnesses:
ROY M. BENNETHUM,
MATTIE J. HIRST.